US009009843B2

(12) United States Patent
Reddy et al.

(10) Patent No.: US 9,009,843 B2
(45) Date of Patent: *Apr. 14, 2015

(54) SOCIAL DISCOVERY OF USER ACTIVITY FOR MEDIA CONTENT

(71) Applicant: Google Inc., Mountain View, CA (US)

(72) Inventors: Raymond Reddy, Toronto (CA); Robert Sang-Heun Kim, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,074

(22) Filed: Oct. 18, 2013

(65) Prior Publication Data
US 2014/0115061 A1 Apr. 24, 2014

Related U.S. Application Data

(63) Continuation of application No. 13/551,405, filed on Jul. 17, 2012, now Pat. No. 8,661,550, which is a continuation of application No. PCT/IB2011/002964, filed on Oct. 27, 2011.

(60) Provisional application No. 61/407,097, filed on Oct. 27, 2010.

(51) Int. Cl.
*H04L 29/06* (2006.01)
*H04L 29/08* (2006.01)
*H04L 12/58* (2006.01)

(52) U.S. Cl.
CPC .............. *H04L 67/22* (2013.01); *H04L 51/02* (2013.01); *H04L 51/32* (2013.01); *H04L 51/046* (2013.01)

(58) Field of Classification Search
CPC ......... H04L 51/02; H04L 51/32; H04L 67/22; H04L 51/046
USPC .......................... 726/26, 6; 709/204; 707/784
See application file for complete search history.

(56) References Cited

U.S. PATENT DOCUMENTS

| 7,669,123 B2 | 2/2010 | Zuckerberg et al. |
| 7,725,492 B2 | 5/2010 | Sittig et al. |
| 7,752,552 B2 | 7/2010 | Pennington et al. |
| 8,140,621 B2 * | 3/2012 | Vance et al. ................... 709/204 |

(Continued)

OTHER PUBLICATIONS

The Free Dictionary by Farlex, Medium, Apr. 25, 2013, The Free Dictionary by Farlex.

*Primary Examiner* — Michael Pyzocha
(74) *Attorney, Agent, or Firm* — McDermott Will & Emery LLP

(57) ABSTRACT

Aspects of the present disclosure provide techniques that may enable user activity information to be automatically generated and shared with other users of a social network. In one example, a method of automatically publishing, to one or more social network services, information about user activities regarding media content items includes receiving user activity information regarding a media content item, wherein a user is a member of one or more social network services, and the user activity information is generated in response to one or more activities taken by the user with respect to the media content item. The method may also include receiving an indication of one or more users of the one or more social network services to whom the user activity information is to be made accessible, and automatically publishing the user activity information to the one or more social network services.

20 Claims, 5 Drawing Sheets

(56) References Cited

U.S. PATENT DOCUMENTS

| | | |
|---|---|---|
| 8,533,269 B2 * | 9/2013 | Brown .................. 709/205 |
| 2005/0149397 A1 | 7/2005 | Morgenstern et al. |
| 2006/0041477 A1 | 2/2006 | Zheng |
| 2006/0190281 A1 | 8/2006 | Kott et al. |
| 2007/0174389 A1 | 7/2007 | Armstrong et al. |
| 2008/0040474 A1 | 2/2008 | Zuckerberg et al. |
| 2008/0134040 A1 * | 6/2008 | Pennington et al. .......... 715/733 |
| 2008/0209340 A1 | 8/2008 | Tonse et al. |
| 2008/0306974 A1 * | 12/2008 | Van Steenbergen et al. . 707/100 |
| 2009/0006415 A1 | 1/2009 | McAniff et al. |
| 2009/0037257 A1 | 2/2009 | Stuckey et al. |
| 2009/0132311 A1 | 5/2009 | Klinger |
| 2009/0132366 A1 | 5/2009 | Lam et al. |
| 2009/0133069 A1 | 5/2009 | Conness et al. |
| 2009/0144369 A1 | 6/2009 | Brown |
| 2009/0182589 A1 | 7/2009 | Kendall et al. |
| 2009/0222750 A1 * | 9/2009 | Jain et al. .................. 715/767 |
| 2009/0282144 A1 | 11/2009 | Sherrets et al. |
| 2009/0300680 A1 | 12/2009 | Cook et al. |
| 2009/0319610 A1 | 12/2009 | Nikolayev et al. |
| 2009/0327308 A1 | 12/2009 | Carter et al. |
| 2010/0082688 A1 | 4/2010 | Davis et al. |
| 2010/0106730 A1 | 4/2010 | Aminian et al. |
| 2010/0162324 A1 * | 6/2010 | Mehta et al. .................... 725/61 |
| 2010/0198678 A1 * | 8/2010 | Burst et al. ................. 705/14.39 |
| 2010/0208662 A1 * | 8/2010 | Fuste Vilella et al. ........ 370/328 |
| 2011/0066710 A1 * | 3/2011 | Paul .............................. 709/222 |
| 2011/0161085 A1 | 6/2011 | Boda et al. |
| 2011/0161159 A1 | 6/2011 | Tekiela et al. |
| 2011/0202430 A1 * | 8/2011 | Narayanan et al. .......... 705/27.1 |
| 2011/0208616 A1 * | 8/2011 | Gorman et al. ............... 705/27.1 |
| 2011/0246882 A1 * | 10/2011 | Kollenkark et al. .......... 715/716 |
| 2011/0258535 A1 * | 10/2011 | Adler et al. .................... 715/235 |
| 2011/0307397 A1 * | 12/2011 | Benmbarek ................... 705/319 |
| 2011/0320284 A1 | 12/2011 | Tennenholtz et al. |
| 2012/0009903 A1 | 1/2012 | Schultz et al. |
| 2012/0030587 A1 * | 2/2012 | Ketkar .......................... 715/751 |
| 2012/0047529 A1 * | 2/2012 | Schultz et al. .................. 725/34 |
| 2012/0054010 A1 * | 3/2012 | Bouta et al. ................. 705/14.16 |
| 2012/0209674 A1 | 8/2012 | Neysradt et al. |
| 2012/0233020 A1 | 9/2012 | Eberstadt et al. |
| 2013/0061296 A1 | 3/2013 | Reddy et al. |

* cited by examiner

SOCIAL DISCOVERY OF USER ACTIVITY FOR MEDIA CONTENT

RELATED APPLICATIONS

This application is a continuation of U.S. application Ser. No. 13/551,405, filed Jul. 17, 2012, which is a continuation of Application Serial No. PCT/IB2011/002964, filed Oct. 27, 2011, which claims the benefit of U.S. Provisional Application No. 61/407,097, filed Oct. 27, 2010, the entirety of which are incorporated by reference herein.

TECHNICAL FIELD

The disclosure relates to electronic media content and, more particularly, to sharing information about users interacting with the electronic media content.

BACKGROUND

Computing networks enable users to access and interact with electronic media content (hereinafter "media content"), including: audio content (e.g., music, audio books, podcasts, etc.), visual content (e.g., videos, images, etc.), textual content (e.g., electronic books, etc.), and program content (e.g., software applications, computer programs, etc.).

SUMMARY

In one example, a method includes receiving, by a computing device, user association information from a client device, and receiving, by the computing device, user activity information, wherein the user activity information is generated in response to one or more actions performed by a user of the client device at a media application executable by the client device without requiring the user to enter a command to cause the user activity information to be generated, and wherein the user activity information includes an indication of at least one of playing media content, viewing media content, purchasing media content, organizing media content, commenting on other user activity information, executing media content, and downloading media content. The method may also include outputting the user activity information for the client device based on the user association information.

In another example, a computer-readable storage medium includes instructions that, when executed, cause one or more processors to perform operations. The operations include receiving, by a computing device, user association information from a client device, and receiving, by the computing device, user activity information, wherein the user activity information is generated in response to one or more actions performed by a user of the client device at a media application executable by the client device without requiring the user to enter a command to cause the user activity information to be generated, and wherein the user activity information includes an indication of at least one of playing media content, viewing media content, purchasing media content, organizing media content, commenting on other user activity information, executing media content, and downloading media content. The operations may further include outputting the user activity information for the client device based on the user association information.

In another example, a device includes at least one programmable processor, a network interface, and a user activity server. The network interface is configured to receive user association information from a client device, and receive user activity information, wherein the user activity information is generated in response to one or more actions performed by a user of the client device at a media application executable by the client device without requiring the user to enter a command to cause the user activity information to be generated, and wherein the user activity information includes an indication of at least one of playing media content, viewing media content, purchasing media content, organizing media content, commenting on other user activity information, executing media content, and downloading media content. The user activity server is operable by the one or more processors to output the user activity information for the client device based on the user association information.

The details of one or more embodiments are set forth in the accompanying drawings and the description below. Other features, objects, and advantages will be apparent from the description and drawings, and from the claims.

DETAILED DESCRIPTION

People listen to music, install applications, and generally interact with various different types of electronic media content. Media applications may enable users to view, execute, listen, purchase, install, or otherwise interact with a variety of media content items. One or more other users (e.g., friends, family members, or other individuals) may wish to learn which the media content items with which the user is interacting. For example, friends and family may be a good source of information about new software applications, music, books, movies, etc. that a particular person may enjoy. However, friends and family members may use different media applications or different computing platforms for interacting with the media content, which may make it more difficult to share the information with each other.

Techniques of the present disclosure provide a mechanism for a person to share information about media content and the person's interactions with the media content with select other people even though the people may use different media applications that may be incompatible. Further, techniques of the present disclosure may enable the user activity performed by a person (e.g., through interacting with media content) to be automatically shared with selected individuals. That is, as the person interacts with the media content items, the media application may store information about the user activity and automatically publish information about the user activity to selected people without requiring the person to perform additional activities (e.g., issue a command to the media application, manually enter user activity information into a third party service, etc.) to cause the information to be published. In some examples, user activity information may be published to a subset of users of a social network as defined by user association information. User activity information may be generated in a manner that is transparent to the user as the user interacts with media content via a media application.

Figure 1:
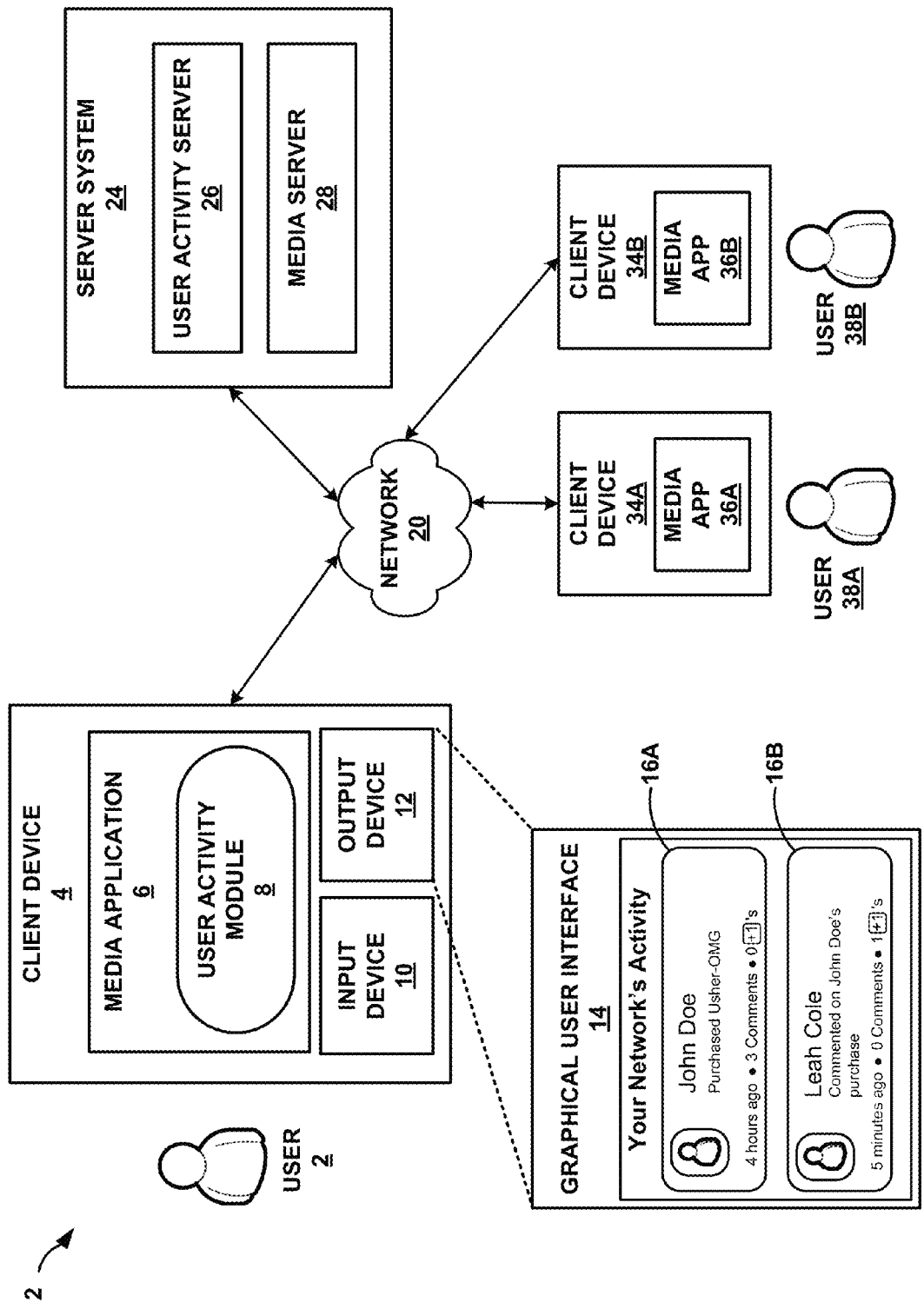
FIG. 1 is a conceptual diagram illustrating an example network system for social discovery of user activity for media content, in accordance with one or more aspects of this disclosure.

FIG. 1 is a conceptual diagram illustrating an example network system for social discovery of user activity for media content, in accordance with one or more aspects of this disclosure. FIG. 1 includes client devices 4, 34 and server system 24. Client device 4 includes input device 10, output device 12, and media application 6, which further includes user activity module 8. Media application 6 may further cause output device 10 to display graphical user interface (GUI) 14. GUI 14 may further include social network activity entries 16A, 16B. Client devices 34A, 34B are computing devices similar to client device 4 and further include respective media applications 36A, 36B similar to media application 6.

Server system 24 may include one or more server computing devices. As shown in FIG. 1, server system 24 includes user activity server 26 and media server 28. Each of client devices 4, 34 and server system 24 may be operatively coupled by network 20. Network 20 may include wired or wireless networks or both. For example, network 20 may include a wide-area network such as the Internet, a local-area network (LAN), a wireless local-area network (WLAN), an enterprise network, or one or more other types of networks. In some examples, network 20 may include one or more different networks. For instance, client device 4 and server system 24 may communicate using a WLAN, and client devices 34A, 34B may communicate with server system 24 using the Internet.

Examples of client devices 4, 34, may include, but are not limited to, portable or mobile devices such as mobile phones (including smart phones), laptop computers, personal digital assistants (PDAs), portable gaming devices, portable media players, and e-book readers. Client device 4 and each of client devices 34 may be the same or different types of devices. For example, client device 4 and client device 34A may both be mobile phones. In another example, client device 4 may be a mobile phone and client device 34A may be a desktop computer.

Client devices 4, 34 may include one or more input devices 10. Input device 10 may include keyboards, pointing devices, microphones, presence-sensitive screens, and cameras capable of recording one or more images or video, as non-limiting examples. Client devices 4 and 34 may also include one or more output devices, e.g., output device 12 of client device 4. Examples of output device 12 may include a video graphics card, computer display, sound card, presence-sensitive screen, and speakers.

Client devices 4, 34 may include media applications 6, 36. Media applications 6, 36 may provide similar or the same functionality. In some examples, media applications 6, 36 may include mobile or desktop computer applications that provide functionality described here. Media applications 6, 36 may be, for example, a media player application, a media viewer application, a media browser application, a media organization application, a media purchasing application, etc. Media applications 6, 36 may include user activity modules, such as user activity module 8 as shown in media application 6.

Media application 6 may cause output device 12 to display GUI 14. GUI 14 may include graphical elements such as social network activity entries 16A, 16B. Graphical elements may include any visually perceivable object that may be displayed in GUI 14. Examples of graphical elements may include a background image, video feed, text, control buttons, input fields, or scroll bars. Social network activity entries 16A, 16B correspond to user activity generated by other users within a social network of user 2. In other words, user 2 may be a member of one or more social network services and activity of other users of the social network services may be published to a user account of user 2 at the social network services.

For example, social network activity entry 16A includes user activity information generated by a user named "John Doe" (e.g., user 38A) Social network activity entry 16A indicates that user 38A purchased a song by Usher, titled "OMG" approximately four hours ago. Since the time at which social network activity entry 16A was published (i.e., in the last four hours), various users commented on social network activity entry 16A three times and no one +1'd the entry. As another example, social network activity entry 16B includes user activity information generated by a user named "Leah Cole" (e.g., user 38B). Social network activity entry 16B indicates that user 38B commented on user 38A's song purchase five minutes ago and one person +1'd her comment. In some examples, the user activity of user 38A and user 38B can be automatically published to other users within the social network in real-time or near real-time such that shortly after user 38A purchased User's "OMG", social network activity entry 16A was published and viewable by user 2 in GUI 14 without requiring user 38A to enter a command to cause the user activity to be published.

In at least one implementation, user activity module 8 is configured to generate user activity information in response to a user's (e.g., user 2) activity with media application 6. In some examples, user 2 may configure user activity module 8 to continuously capture the user's activity with media application 6 and generate user activity information. In other examples, user 2 may configure user activity module 8 to capture the user's activity with media application 6 for a limited duration, to capture only certain types of activities (e.g., listening to music, reading books, purchasing applications, etc.), or not to capture the user's activity with media application 6.

User activity may refer to a user playing, viewing, purchasing, organizing, commenting, or otherwise interacting with media content, for example, via a media application. That is, the user activity information include captured user interactions with media content items. In at least some implementations, user activity information may comprise one or more of: (1) a user identifier (e.g., user name, identification code, etc.) that identifies a user that performed the user activity, (2) a media content identifier (e.g., artist name, content title, identification code, etc.) that identifies a media content item associated with the user activity, (3) an action identifier that identifies one or more actions (e.g., play, view, purchase, organize, comment, etc.) performed with respect to the media content item, (4) a time identifier that identifies a time at which the one or more actions were performed, (5) a media application identifier that identifies a type of media application (e.g., iTunes, Zune, etc.) utilized to perform the one or more actions, (6) other suitable information. User activity module 8 may be configured to automatically generate user activity information responsive to user 2 interacting with media application 6. That is, user activity module 8 may generate the user activity information responsive to the user interacting with media application 6 without receiving further user interaction (e.g., a command or other direct indication) from user 2 to generate the user activity information. In various instances, user activity associated with user 2 may also be included within GUI 14.

User activity information generated by user activity module 8 may be sent by user activity module 8 from client device 4 to server system 24 where the user activity information or a portion thereof may be published to other users (e.g., to users 38A, 38B of client devices 34A, 34B, respectively, by user activity server 26). As one example, user 2 may operate media application 6 to access or otherwise interact with one or more media content items stored locally at client device 4 or at remote data store such as at server system 24. User activity module 8 then sends at least an indication of the user activity (e.g., a message that indicates that user 2 played a particular song, bought a particular software application, read a book, etc.) to user activity server 26 via network 20. In some examples, in addition to, or instead of, sending the user activity information to user activity server 26, the user activity information generated by user activity module 8 may be stored locally at client device 4.

In some examples, user activity module 8 may include a plug-in for media application 6. For example, user 2 may download user activity module 8 from server device 4 or other source such as a plug-in for media application 6. However, user activity module 8 may include an integrated portion of media application 6, in various instances. In at least some implementations, user activity module 8 and/or media application 6 may instead reside at a server (e.g., media server 28 of server system 24) that is remote from client device 4, whereby user 2 may operate client device 4 to interact with the remote media application (e.g., media server 28) via network 20. Accordingly, user activity module 8 may reside at any suitable location or combination of locations in a computing network. In at least some implementations, user activity module 8 may include an application programming interface (API) that enables other computer applications or programs (such as e.g., user activity server 26 or other suitable resource) to obtain user activity information or user association information from user activity module 8 or to provide user association information to user activity module 8.

In some embodiments, user activity server 26 can be configured to obtain user activity information from one or more of client devices 4, 34 and publish the user activity information or portion thereof to other users. User activity information may be published to a subset of users of a social network as defined by user association information linking users in the social network. In some examples, user activity server 26 may obtain user association information from each user of a social network via respective clients. User activity server 26 may utilize user association information to control publication of user activity information among users of the social network. The user association information may specify a subset of the users of the social network to which the user activity information should be published (i.e., enable a subset of the users of the social network to view the user activity information) or may specify that the user activity information should be published to all of the users of the social network (i.e., enable all of the users of the social network to view the user activity information). In general, the user association information specifies one or more groups of users to which the user activity information should be published or otherwise made available. The groups of users may include all users of one or more social network services or a subset of the users of the one or more social network services.

In some examples, user activity server 26 may utilize previously specified user association information (i.e., user association information that is not provided to user activity server 26 at the time when user activity server 26 generates the user activity information and/or receives the user activity information from one of client devices 4, 34) to control the publication of the user activity information. That is, in some examples, a user (e.g., user 2) may provide a default group of users to which to publish the user activity information. User 2 may override, modify, or otherwise change the previously provided user association information by, for example, providing new user association information at or about the same time as performing the one or more activities with respect to the media content items.

User 2 may also provide different user association information for each different type of media content item, for each different social network service, and/or for each different type of activity taken by user 2 with respect to the media content items. For example, user 2 may provider user association information that specifies that a first group of users (e.g., a book club) should received user activity information about books that user 2 is reading and provide different user association information that specifies that a second group of users should receive user activity information about music user 2 has purchased. As another example, user 2 may provide user association information to specify various groups of users that may receive user activity information about purchased media content items, installed media content items, and/or deleted media content items. The groups of users may include users that all belong, subscribe, or are otherwise members of one social network service or that span two or more different social network services (i.e., where a first user of the group belongs to a first social network service and a second user of the group belongs to a second social network service).

In other examples, such as when no user association information was previously provided by a user, user activity server 26 may cause user activity client 8 to display at GUI 14 a request for user association information. User 2 may then provide the user association information that is used to control the publication of the user activity information generated based on the actions taken by user 2 with respect to the media content items. In at least some implementations, user activity information may be published to only the subset of users indicated by the user association information, thereby enabling a user to control publication of the user's activity information. In at least some implementations, user activity server 26 may comprise an application programming interface (API) that enables other computer applications or programs to provide user activity information or user association information to user activity server 26 or to obtain user activity information or user association from user activity server 26.

Figure 2:
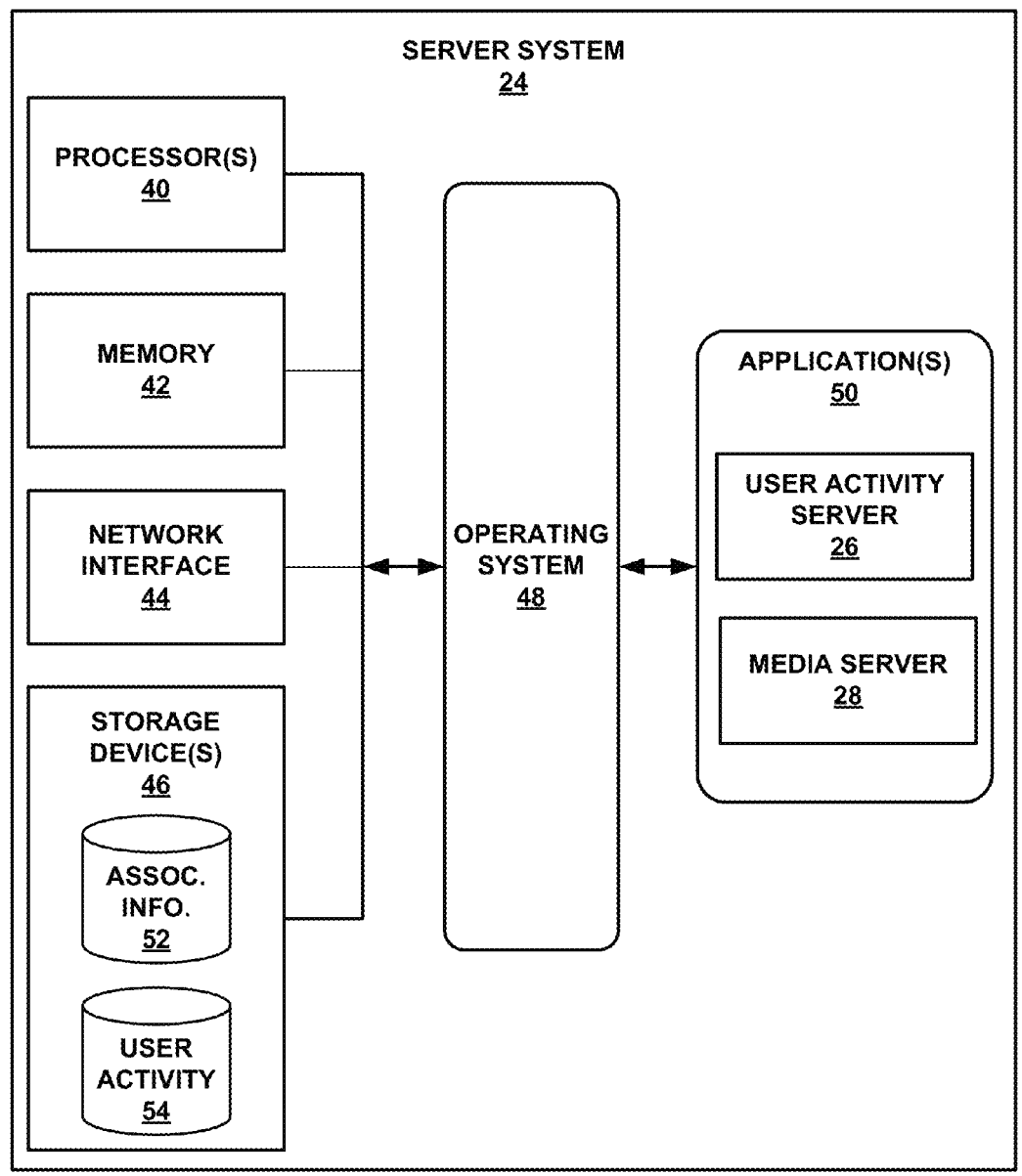
FIG. 2 is a block diagram illustrating an example computing device for generating and publishing user activity information based at least in part of user association information, in accordance with one or more aspects of this disclosure.

FIG. 2 is a block diagram illustrating an example computing device for generating and publishing user activity information based at least in part of user association information, in accordance with one or more aspects of this disclosure. FIG. 2 illustrates only one particular example of server system 24, and many other example embodiments of server system 24 may be used in other instances.

As shown in the specific example of FIG. 2, server system 24 includes one or more processors 40, memory 42, a network interface 44, and one or more storage devices 46. Server system 24 also includes an operating system 48 that is executable by server system 24. Server system 24, in one example, further includes user activity server 26 and media server 28 that are also executable by server system 24. Each of components 40, 42, 44, 46, 48, 26, and 28 may be interconnected (physically, communicatively, and/or operatively) for inter-component communications.

Processors 40, in one example, are configured to implement functionality and/or process instructions for execution within client device 4. For example, processors 40 may be capable of processing instructions stored in memory 42 or instructions stored on storage devices 46.

Memory 42, in one example, is configured to store information within server system 24 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on server system 24 (e.g., applications 50) to temporarily store information during program execution.

Server system 24, in some examples, also includes a network interface 44. Server system 24, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server system 24 utilizes network interface 44 to wirelessly communicate with an external device such as client devices 4, 34 of FIG. 1, a mobile phone, or other networked computing device.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. As shown in FIG. 2, storage devices 46 includes association information data repository (ASSOC. INFO.) 48 and user activity data repository 50. Association information data repository 50 and user activity data repository 50 may each be configured as a database, flat file, table, or other data structure stored within storage devices 46 of server system 24. In some examples, association information data repository 50 and user activity data repository 50 may be configured as two separate data repositories while, in other examples, they may be a part of a single data repository.

Server system 24 may include operating system 48. Operating system 48, in some examples, controls the operation of components of server system 24. For example, operating system 48, in one example, facilitates the interaction of user activity server 26 and/or media server 28 with processors 40, memory 42, network interface 44, and storage device 46. Applications 50, user activity server 26, and media server 28 may each include program instructions and/or data that are executable by server system 24. For example, user activity server 26 may include instructions that cause server system 24 to perform one or more of the operations and actions described in the present disclosure.

In accordance with aspects of the present disclosure, user activity server 26 may receive user association information and/or user activity information from client devices 4, 34 of FIG. 1. For example, upon installation or configuration of user activity module 8 at client device 4, user 2 may provide user association information that specifies one or more one or more social network services (e.g., Google+, Facebook, LinkedIn, etc.) and/or includes information that identifies one or more users that are to receive user activity information generated responsive to actions performed by user 2. User activity module 8 may send the user association information to user activity server 26. User activity server 26 may receive the user association information and store it within association information data repository 48. In general, association information data repository 48 may be configured to store any type of user association information received from one or more different client devices (e.g., client devices 4, 34).

User activity server 26 may authenticate at the one or more social network services using any user authentication information included in the user association information such that, when user activity server 26 either generates or receives user activity information, user activity server 26 may publish at least an indication of the user activity information at the social network services such that the user activity information is accessible to one or more users of the social network services. User activity server 26 may also configure, e.g., a user account associated with user 2, based on the user identification information included in the user association information such that, when user activity server 26 generates or receives user activity information associated with user 2, at least an indication of the user activity information is published to the users identified in the received user association information.

User activity server 26 may receive user activity information from client devices 4, 34 and/or may generate user activity information based on information received from media server 28. In examples where media application 6 accesses media store at server system 24, media application 6 may exchange information with media server 28. The information exchanged with media server 28 may include commands to view, playback, purchase, install, or otherwise interact with media content as well as user account information. Media server 28 may receive the commands and perform various actions based on the commands, such as outputting an audio file to media application 6. As media server 28 processes the commands, media server 28 may send an indication of the commands, the media content associated with the commands, and user information that identifies the user interacting with media application 6 (e.g., user 2) to user activity server 26 for generation of user activity information. User activity server 26 generates the user activity information based on the information received from media server 28 and stores at least an indication of the user activity information in user activity data repository 50.

User activity server 26 may publish user activity information whether user activity server 26 receives user activity information from user activity module 8 or generates user activity information from information received from media server 28. When publishing the user activity information, user activity server 26 may use user association information and/or user authentication information received from a user (e.g., user 2). In some examples, the user authentication information is included within the received user association information. User activity server 26 identifies any social network services for which it has received user authentication information and authenticates with the social network services. User activity server 26 then publishes the user activity information at the social network services on behalf of the user and without requiring the user to take further actions to cause the user activity information to be published. In some examples, when publishing user activity information for a first time at each social network service, user activity server 26 may send a command to user activity module 8 to cause a notification and/or request for authorization to be displayed in GUI 14.

User activity server 26 may also publish the user activity information other than at social network services. For example, when the user association information includes information about one or more other users (e.g., an email address, instant messaging username, phone number, etc.), user activity server 26 may text, email, call, message, or otherwise publish the user activity information to the users specified in the user association information. In examples where social network service information as well as information about one or more other users are both included in the user association information received by user activity server 26, user activity server 26 may both publishing the user activity information at the social network services and send the user activity information to the other users in a manner determined based on the information about the other users.

Figure 3:
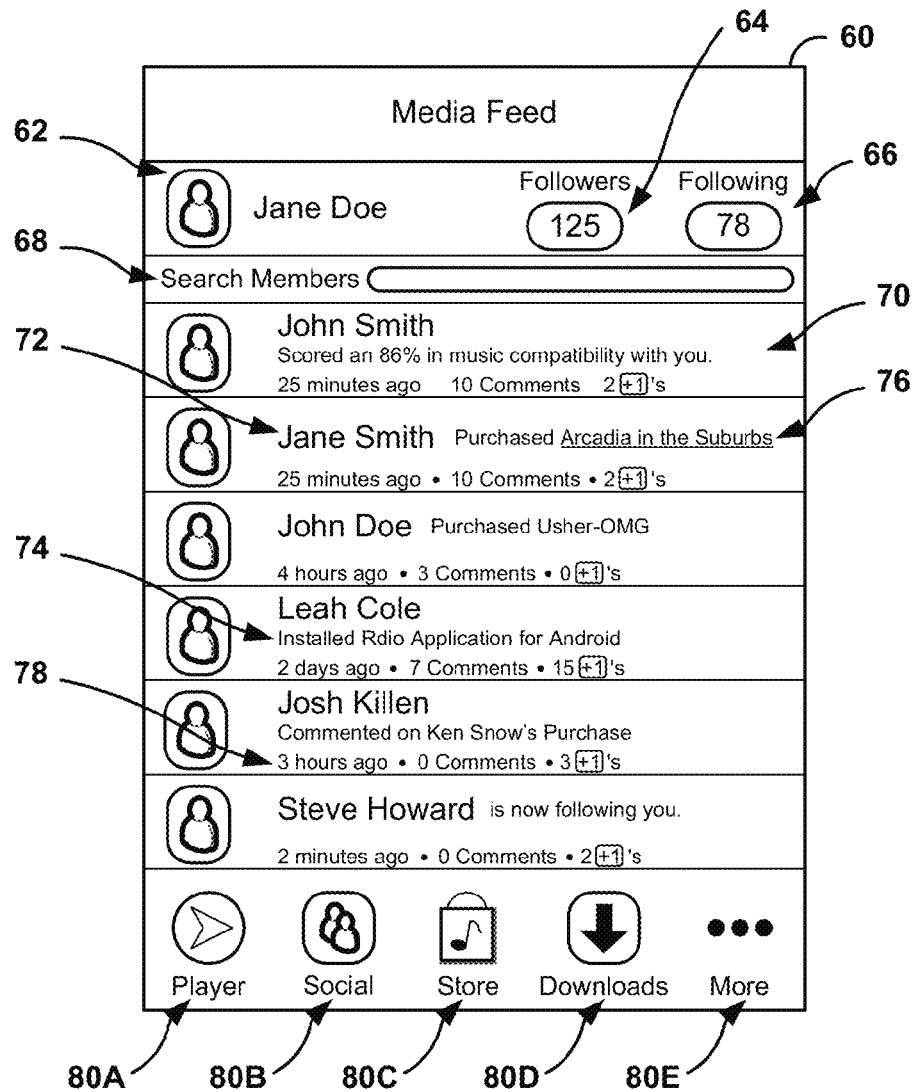
FIG. 3 is a screen illustration showing an example graphical user interface that includes published user activity information, in accordance with one or more aspects of the present disclosure.

FIG. 3 is a screen illustration showing an example graphical user interface that includes published user activity information, in accordance with one or more aspects of the present disclosure. For purposes of illustration only, the example screen illustration is described below within the context of system 2 of FIG. 1. As one example, FIG. 3 depicts a GUI 60 may be configured for a mobile device (e.g., client device 4) and may comprise part of a software application for a mobile device (e.g., media application 6).

GUI 60 provides an example of user activity information that may be published to a user activity feed presented on a graphical display of a client. GUI 60 shows for a given user 62, a user activity feed that comprises user activity information generated in response to user activity of other users having an associational relationship with the user. For example, GUI 60 includes follower information 64, following information 66, search box 68, and user activity entries 70. User 62 may provide a profile picture to include in GUI 60 that may be displayed when user 62 views GUI 60 and may also be included in user activity entries 70 that include user activity information based on actions associated with user 62.

User 62 may select one or more other users to follow and may be followed by one or more other users. To follow another user means to subscribe to or otherwise receive user activity information for the other user. To be followed by another user means that the other user receives user activity information generated based on actions associated with user 62. GUI 60 may include a graphical and/or textual indication of a number of users following user 62 (i.e., followers 64) and a number of users that user 62 is following (i.e., following 66).

Each user activity entry 70 may include one or more of a user identifier 72, an action identifier 74, a media content identifier 76, and an activity status indicator 78 for a given user. User identifier 72 may include a name of a user and a picture or other image selected by the user. Action identifier 74 includes information about how the user (e.g., user 72) interacted with the media application and/or other information describing a user activity. For example, in the first user activity entry 70, action identifier 74 indicates that John Smith "scored an 86% in music compatibility" with user 62. In the second user activity entry 70, action identifier 74 indicates that Jane Smith made a purchase. In some examples, user activity entry 70 includes media content identifier 76 that indicates a particular name, artist, publisher, title, etc. of the media content associated with action identifier 74 (e.g., the Radio application for Android was installed by Leah Cole).

Media content identifier 76 may include a link to a store where a user can purchase the media content, link to additional information about the media content, and/or activate a preview of the media content (e.g., when the media content is an audio file). Activity status indicator 78 includes information about when the user activity occurred (i.e., "3 hours ago"), whether any users have commented on the user activity (i.e., "0 comments"), and whether any users have +1'd the user activity (i.e., "3+1's").

GUI 60 may also include buttons 80A-E that may enable a user (e.g., user 62) to cause different graphical user interfaces to be displayed and perform different actions. For example, activation of button 80A may cause a media player interface to be displayed that may enable a user to control playback of various audio and/or video content. Activation of button 80B may cause a social network service interface to be displayed that may enable a user to configure user association information. In some examples, the social network service interface may include additional information about media content recommended by one or more users that user 62 is following. Activating button 80C may cause a store interface to be displayed that may enable a user to preview, purchase, and download additional media content. Activating button 80D may cause a download interface to be displayed that includes information about any media content that may be actively downloading or may have been previously downloaded (e.g., from an online store). Activating button 80E may cause other interfaces to be displayed that may enable a user to perform additional functions. For example, a configuration interface may be displayed that enables a user to configure user account information and manage the distribution of user activity information associated with the user.

While not depicted in FIG. 3, GUI 60 may further include a media application identifier to indicate that media content identifier 76 was purchased via a particular media application, such as iTunes, for example. In at least some implementations, user activity information may be presented as hyperlinks that enable a user to select the hyperlink to access additional information. For example, a media content identifier may be selected by a user to sample and/or purchase the media content identified by the media content identifier. Selectable icons may also be presented to enable users to access additional information, sample, or purchase media content.

Figure 4:
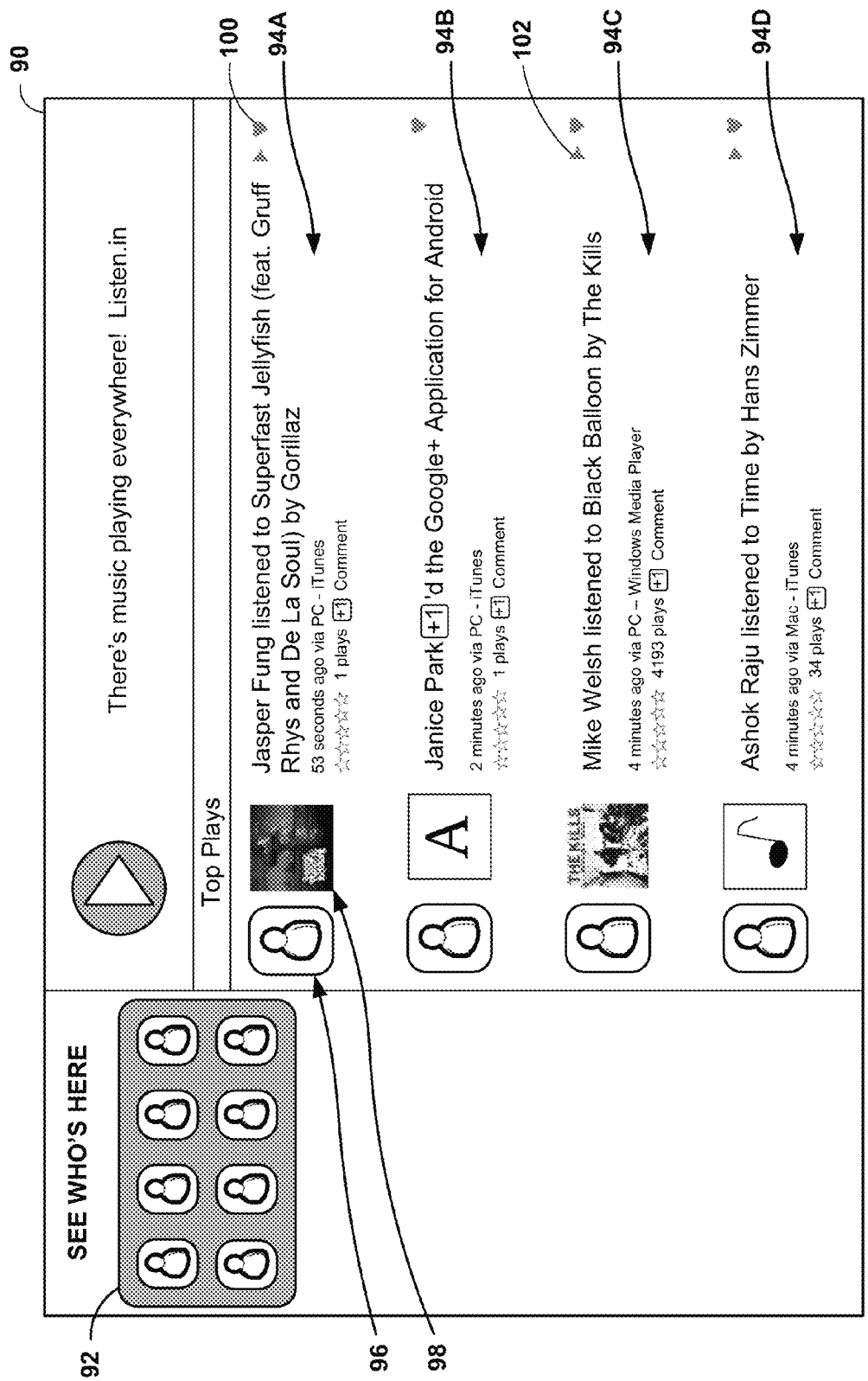
FIG. 4 is a screen illustrating showing another example user interface that includes published user activity information, in accordance with one or more aspects of the present disclosure.

FIG. 4 is a screen illustrating showing another example user interface that includes published user activity information, in accordance with one or more aspects of the present disclosure. For purposes of illustration only, the example screen illustration is described below within the context of system 2 of FIG. 1. As one example, FIG. 4 depicts a graphical user interface 90 that may be accessed via a browser application (e.g., executing at one of client devices 4, 34).

GUI 90 may be generated by a browser application responsive to a user (e.g., user 2) logging into a website. As shown in FIG. 4, GUI 90 includes active users display 92 and user activity entries 94A-94D. Active users display 92 may include one or more graphical representations of users within a social network of user 2 that are also logged in to or otherwise accessing the website while user 2 is logged in to the website. For example, if user 38A of FIG. 1 is within a social network of user 2 (e.g., as determined by user association information), a graphical representation of user 38A may be included in active users display 92. The graphical representation may be chosen by the user whom it represents (e.g., an avatar). A user may select one or more of the users included in active users display 92 to view user activity associated with the selected user, chat with the user, or otherwise filter content based on or interact with the selected user.

Each user activity entry 94 may include a user graphics 96 and media content graphics 98. User graphics 96 may be a graphical representation associated with a user and, in various instances, is the same graphical representation as the graphical representation for the user displayed in active users display 92. Media content graphics 98 may be a graphical representation of the media content described in each user activity entry 94. For example, user activity entry 94A describes a user listening to a song. In this example, media content graphics 98 may be album cover art of the album that includes the particular version of the song that listened to by the user. If no cover art is associated with the song or is otherwise unavailable, media content graphics 98 may be a generic icon that may be used for any music media content. In another example, user activity entry 94B includes a user +1'ing a software application. In this example, media content graphics 98 may be a graphical icon associated with the application. If no graphical icon is associated with the application or if the graphical icon is unavailable, media content graphics 98 may be a generic icon that represents any media content that is a software application. Similarly, if the media content described in a user activity entry is a book, the media content graphics may be cover art for the book, if available, or a generic icon that may be used for any book.

User activity entries 94 may also include heart button 100, and play button 102. Heart button 100 may enable a user to +1, like, or otherwise indicate approval of the respective user activity entry 94. Play button 102 may be included in user activity entries 94 when user activity entries describe media content that may be played for a user, such as an audio and/or video file. In some examples, a limited preview of the song, book, video, or other media content may be played for a user upon activating play button 102. In some example, such as when the media content described in the user activity entry is an application, play button 102 may not be included. Alternatively, when the media content described in the user activity entry is an application, play button 102 may be included, but may redirect the user to a web page or other source for information about the application.

Figure 5:
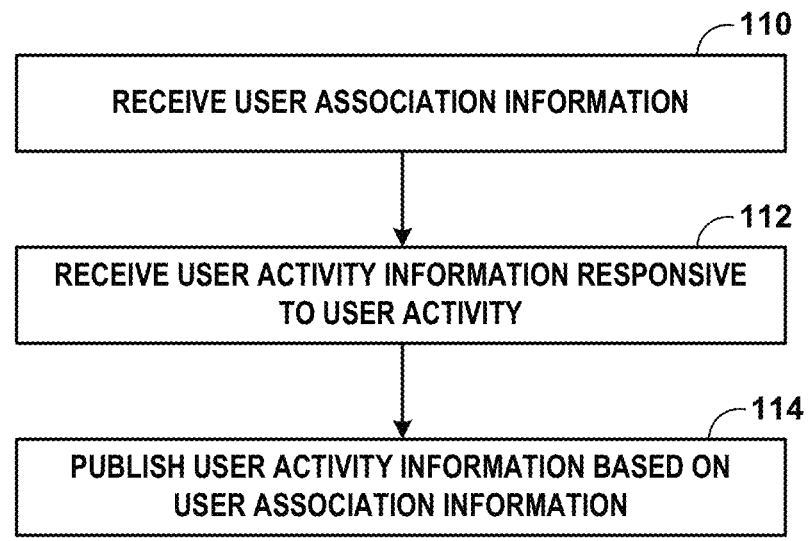
FIG. 5 is a flow chart illustrating an example process for aggregating and publishing user activity information based at least in part of user association information, in accordance with one or more aspects of this disclosure.

FIG. 5 is a flow chart illustrating an example process for aggregating and publishing user activity information based at least in part of user association information, in accordance with one or more aspects of this disclosure. For purposes of illustration only, the example process is described below as being performed by one or more elements of system 2 of FIG. 1 and server system 24 of FIG. 2.

User activity server 36 may receive user association information (110). User association information may define associational relationships between users in a social network. For example, a user may define an associational relationship between the user and one or more other users. Such an associational relationship may be referred to as a "friend" in some social networks. As one example, server system 24 may obtain (e.g., via user activity server 26) user association information from client devices 4, 34. For example, user 2 of client device 4 may select (e.g., via user activity module 8, media application 6, or other suitable application) one or more other users with which to form an associational relationship. Users may be identified and distinguished from each other within a social network by respective user identifiers, for example.

User association information may be sent by client devices 4, 34 to server system 24. For example, user activity module 8 may send user association information to server system 24 or may send an indication of a location where the user association information may be obtained by server system 24. Server system 24 may receive the user association information from client devices 4, 34 and store the user association information in user association information data repository 48. For example, user association information data repository 48 may comprise a relational database where, for each user, a number of other users having an associational relationship with that user are identified.

In at least some implementations, a user may import user association information from a pre-existing social network. For example, user activity module 8 may comprise or support an application programming interface by which user association information may be obtained from pre-existing third party social networks such as Facebook, Twitter, MySpace, iTunes Ping, etc. for a given user.

User activity server 26 may also received and/or generate user activity information responsive to user activity (112). In at least some implementations, user activity information may be generated by a user activity module such as previously described with respect to user activity module 8 and user activity server 26. User activity information may be generated in a manner that is transparent to the user as the user interacts with media content via a media application.

User activity may refer to a user playing, viewing, purchasing, organizing, commenting, or otherwise interacting with media content, for example, via a media application. For example, user 2 of client device 4 may operate media application 6 to play, view, purchase, organize, comment on, or otherwise interact with media content. Media content may reside locally at client device 4 or may reside at a remote data store such as within server system 24. Organizing media content may include grouping media content (e.g., creating or modifying playlists), for example. Commenting on media content may include, for example, tagging, rating, or associating commentary with media content.

In at least some implementations, user activity module 8 may generate user activity information responsive to user activity with media application 6. In at least some implementations, user activity information may comprise one or more of: (1) a user identifier (e.g., user name, identification code, etc.) that identifies a user that performed the user activity, (2) a media content identifier (e.g., artist name, content title, identification code, etc.) that identifies a media content item associated with the user activity, (3) an action identifier that identifies one or more actions (e.g., play, view, purchase, organize, comment, etc.) of the user activity performed with respect to the media content item, (4) a time identifier that identifies a time at which the one or more actions were performed, (5) a media application identifier that identifies a type of media application (e.g., iTunes, Zune, etc.) utilized to perform the one or more actions, and (6) other suitable information.

Server system 24 may receive user activity information from any number of clients. Server system 24 may store user activity information received from clients in user activity data repository 50. User activity server 26 may obtain user activity information received from clients and may process the user activity information. For example, user activity server 26 may obtain a user identifier from the user activity information received from a client, and may identify other users having an associational relationship with the user identified by the user identifier based on user association information for the user. User activity server 26 may direct user activity information or portion thereof to other network resources for publication to other users.

User activity server 26 may publish user activity information based on the received user association information (114). As one example, server system 24 may send user activity information or select portions thereof to one or more network resources for publication to other users having an associational relationship with a user from which the user activity information originated. In this way, a user having an associational relationship with another user may obtain notification of the user's activity with media content via a media application.

Publishing user activity information may include presenting one or more of: (1) the user identifier or representation thereof, (2) the media content identifier or representation thereof, (3) the action identifier or representation thereof, (4) the time identifier or representation thereof, (5) the media application identifier or representation thereof, (6) other suitable information. In at least some implementations, user activity server 26 and/or user activity module 8 may comprise an API for enabling user activity information to be obtained by pre-existing social network platforms such as, for example, Facebook, Twitter, MySpace, iTunes Ping, etc.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method of automatically publishing, to one or more social network services, information about user activities regarding media content items, the method comprising:
   receiving, by a computing system, user configuration information for a user, the user configuration information indicating one or more types of activities, selected by the user from multiple types of activities, for which the computing system is to capture user activity information;
   receiving, by the computing system, the user activity information regarding a media content item, wherein:
      the user is a member of one or more social network services,
      the user activity information is automatically generated in response to one or more activities taken by the user with respect to the media content item,
      the one or more types of activities comprise at least one of playing the media content item, viewing the media content item, purchasing the media content item, organizing the media content item, commenting on other user activity information regarding the media content item, executing the media content item, or downloading the media content item, and
      the user activity information is transmitted to the computing system;
   receiving, by the computing system, user association information that includes an indication of one or more users of the one or more social network services to whom the user activity information is to be made accessible; and
   automatically publishing, by the computing system, the user activity information to the one or more social network services based on the user association information, such that the user activity information is accessible to the one or more users.

2. The method of claim 1,
wherein the user association information includes user authentication information for the one or more social network services, and
wherein automatically publishing, by the computing system, the user activity information comprises:
   authenticating at each of the one or more social network services using the user authentication information; and
   publishing the user activity information at each of the one or more social network services.

3. The method of claim 2,
wherein the user association information includes an indication of a subset of users of at least one of the one or more social network services, and
wherein automatically publishing the user activity information to the one or more social network services comprises publishing the user activity to the subset of the users.

4. The method of claim 1,
wherein the user association information includes contact information for one or more other users, and
wherein automatically publishing the user activity information comprises outputting the user activity information to the one or more other users based on the contact information.

5. The method of claim 4,
wherein the contact information includes at least one of an email address, a telephone number, and an instant messaging username, and
wherein automatically publishing the user activity information comprises at least one of 1) sending an email to the email address, 2) sending a text message to the telephone number, and 3) sending an instant message to the instant messaging username.

6. The method of claim 1, wherein receiving the user activity information comprises:
receiving, by the computing system, commands that cause a media server of the computing system to perform one or more actions on media content items stored at the computing system; and
generating, by the computing system, the user activity information based on the one or more actions.

7. The method of claim 1, wherein the received user activity information comprises at least one of (1) a user identifier that identifies the user that performed the one or more actions, (2) a media content identifier that identifies a media content item associated with the one or more actions, (3) an action identifier that identifies the one or more actions performed with respect to the media content item, (4) a time identifier that identifies a time at which the one or more actions were performed, and (5) a media application identifier that identifies a type of media application utilized to perform the one or more actions.

8. The method of claim 1, wherein the user activity information is generated by a user activity module of a client device at which the user takes the one or more activities with respect to the media content item.

9. The method of claim 8, wherein the user activity module is a plug-in for a media application of the client device.

10. The method of claim 1, wherein the user is a first user, the method further comprising:
receiving, by the computing system, a comment from a second user about the published user activity information;
updating, by the computing system, the user activity information to include the comment; and
publishing, by the computing system, the updated user activity information to at least one of the one or more social network services.

11. The method of claim 1, further comprising:
receiving, by the computing system, an indication of an approval of the published user activity information;
updating, by the computing system, the user activity information to include the indication of the approval; and
publishing, by the computing system, the updated user activity information to at least one of the one or more social network services.

12. The method of claim 1, further comprising:
receiving, by the computing system and from a second client device, a command to preview the media content item; and
outputting, by the computing device, at least a portion of the media content item to the second client device.

13. The method of claim 1, wherein receiving the user association information comprises:
receiving, by the computing system, social network service user authentication information for the one or more social network services;
authenticating, by the computing system, at each of the one or more social network services; and
receiving the user association information from the one or more social network services.

14. The method of claim 1, wherein the user activity information includes a user identifier that uniquely identifies the user, the method further comprising:
identifying, by the computing system, one or more other users having an associational relationship with the user based on the user identifier; and
outputting the user activity information to the one or more identified other users.

15. The method of claim 1, wherein the media content item includes audio content, visual content, textual content, and program content.

16. The method of claim 1, wherein automatically publishing, by the computing system, the user activity information to the one or more social network services comprises publishing the user activity information to the one or more social network services without receiving, by the computing system, further user interaction prior to publishing the user activity information.

17. A non-transitory computer-readable storage medium comprising instructions that, if executed by one or more processors of a computing system, cause the computing system to perform operations comprising:
receiving user configuration information for a user, the user configuration information indicating one or more types of activities, selected by the user from multiple types of activities, for which the computing system is to capture user activity information;
receiving the user activity information, wherein the user activity information is automatically generated in response to one or more actions performed by a user, wherein the user is a member of one or more social network services, and wherein the one or more types of activities comprise at least one of playing media content, viewing media content, purchasing media content, organizing media content, commenting on other user activity information, executing media content, or downloading media content;
receiving user association information that includes an indication of one or more users of the one or more social network services to whom the user activity information is to be made accessible; and
automatically outputting the user activity information to the one or more social network services based on user association information specified by the user, such that the user activity information is accessible to the one or more users.

18. The non-transitory computer-readable storage medium of claim 17, wherein automatically publishing, by the computing system, the user activity information to the one or more social network services comprises publishing the user activity information to the one or more social network services without receiving, by the computing system, further user interaction prior to publishing the user activity information.

19. A system comprising:
a client computing device having one or more processors and memory, the client computing device configured to:
receive user configuration information for a user, the user configuration information indicating one or more types of activities, selected by the user from multiple types of activities, for which the computing system is to capture user activity information,
wherein the one or more types of activities comprise at least one of playing a media content item, viewing the media content item, purchasing the media content item, organizing the media content item, commenting on other user activity information regarding the media content item, executing the media content item, or downloading the media content item;

automatically capture, based on the one or more types of activities, interactions by a user of the client computing device with the media content item; and transmit to a server computing system 1) the captured interactions and 2) information usable to determine one or more individuals or groups, of one or more social network services, to whom the captured interactions are to be made available;

wherein the server computing system is configured to:

receive 1) the captured interactions, and 2) the information;

determine, based on the information, the one or more individuals or groups to whom the captured interactions are to be made available; and automatically make the captured interactions available to the determined one or more individuals or groups by at least publishing the captured interactions to the one or more social network services.

20. The system of claim 19, wherein automatically making the captured interactions available to the determined one or more individuals or groups comprises making the captured interactions available to the determined one or more individuals or groups without receiving further user interaction prior to making available the captured user interactions.

* * * * *